(12) United States Patent
Yamaguchi et al.

(10) Patent No.: US 8,366,980 B2
(45) Date of Patent: Feb. 5, 2013

(54) METHOD FOR PRODUCING HOLLOW STRUCTUAL BODY

(75) Inventors: Terunori Yamaguchi, Izumiotsu (JP); Shinji Hashiguchi, Izumiotsu (JP); Mitsuo Ueno, Tokyo (JP)

(73) Assignee: Stella Chemifa Corporation, Osaka (JP)

( * ) Notice: Subject to any disclaimer, the term of this patent is extended or adjusted under 35 U.S.C. 154(b) by 380 days.

(21) Appl. No.: 12/668,950

(22) PCT Filed: Jul. 30, 2008

(86) PCT No.: PCT/JP2008/063691
§ 371 (c)(1),
(2), (4) Date: Jan. 13, 2010

(87) PCT Pub. No.: WO2009/017164
PCT Pub. Date: Feb. 5, 2009

(65) Prior Publication Data
US 2010/0196645 A1 Aug. 5, 2010

(30) Foreign Application Priority Data
Jul. 31, 2007 (JP) .................................. 2007-199211

(51) Int. Cl.
*C04B 40/00* (2006.01)
*B27N 3/08* (2006.01)
*F16L 9/00* (2006.01)
*B29C 47/00* (2006.01)

(52) U.S. Cl. ...... 264/83; 264/82; 264/209.1; 264/209.3; 264/211.12; 264/211.13; 428/35.7; 428/36.9; 138/177

(58) Field of Classification Search ............ 264/82, 264/83, 209.1, 209.3, 211.12, 211.13; 428/35.7, 428/36.9; 138/177
See application file for complete search history.

(56) References Cited

U.S. PATENT DOCUMENTS
7,416,766 B2 * 8/2008 Trent et al. ................... 428/35.7
2004/0084793 A1 * 5/2004 Bulow et al. ................. 264/29.1

FOREIGN PATENT DOCUMENTS
| JP | 36-22294 | | 11/1961 |
| JP | 58156012 A | * | 9/1983 |
| JP | 61-006306 A | | 1/1986 |
| JP | 1-180206 A | | 7/1989 |

(Continued)

*Primary Examiner* — Christina Johnson
*Assistant Examiner* — Atul P Khare
(74) *Attorney, Agent, or Firm* — Knobbe Martens Olson & Bear LLP

(57) ABSTRACT

It is intended to provide a method of producing a hollow construct, which may be in various shapes such as a fiber or a film as well as in various sizes and has chemical resistance, made of a fluorinated hydrocarbon polymer, a fluorinated carbon polymer or a polymer carrying a nitrogen-containing group, a silicon-containing group, an oxygen-containing group, a phosphorus-containing group or a sulfur-containing group having been introduced into the above-described polymer; and a hollow construct obtained by this method. The method of producing a hollow construct as described above is characterized by comprising the fluorination step wherein a construct made of a hydrocarbon polymer or a polymer carrying a nitrogen-containing group, a silicon-containing group, an oxygen-containing group, a phosphorus-containing group or a sulfur-containing group having been introduced into the above-described polymer is brought into contact with a treating gas containing fluorine under definite conditions and thus the treating gas is allowed to penetrate from the outer surface of the construct toward the inside thereof to thereby fluorinate the construct excluding the core part, and the removal step wherein the core part having been not fluorinated as described above is removed.

7 Claims, 6 Drawing Sheets

FOREIGN PATENT DOCUMENTS

| | | |
|---|---|---|
| JP | 6-173167 A | 6/1994 |
| JP | 6-228820 A | 8/1994 |
| JP | 6-240534 | 8/1994 |
| JP | 09-078355 A | 3/1997 |
| JP | 2001-248024 A | 9/2001 |
| JP | 2003--105627 A | 4/2003 |
| JP | 2005-248378 A | 9/2005 |
| JP | 2005-256243 A | 9/2005 |
| JP | 2006-009178 A | 1/2006 |
| JP | 2006-045720 | 2/2006 |
| JP | 2007-016356 A | 1/2007 |

* cited by examiner

After immersion in solution C8H18

METHOD FOR PRODUCING HOLLOW STRUCTUAL BODY

This application is the U.S. National Phase under 35. U.S.C. §371 of International Application PCT/JP2008/063691, filed Jul. 30, 2008, which claims priority to Japanese Patent Application No. 2007-199211, filed Jul. 31, 2007. The International Application was published under PCT Article 21(2) in a language other than English.

TECHNICAL FIELD

The present invention relates to a method for producing a hollow structural body, and a hollow structural body obtained by the method, and more particularly to a method for producing a chemical-resistant hollow structural body having an opened hollow structure and made of a fluorinated hydrocarbon polymer, a fluorocarbon polymer, or a polymer having a nitrogen-containing group, a silicon-containing group, an oxygen-containing group, a phosphorus-containing group or a sulfur-containing group introduced into the polymer, and a hollow structural body obtained by the method.

BACKGROUND ART

Heretofore, hollow structural bodies have been produced by various methods. For example, Patent Document 1 discloses a hollow ceramic fiber product and a method for producing the same. The Patent Document describes that the hollow ceramic fiber product is made of a metal oxide having a thickness of 0.1 μm or more precipitated on a peripheral surface of organic fibers from a solution containing a metal compound serving as a precursor, and that holes corresponding to the shape of the organic fibers are formed inside by removing the organic fibers.

However, the hollow ceramic fiber product is made of an inorganic compound of ceramics and has poor lightweight feel compared with a fiber product made of an organic compound. Furthermore, since a metal oxide film is formed by immersing an organic fiber in a solution containing a metal compound serving as a precursor, it is difficult to control a thickness of a coating film.

Also, there are high needs for a fiber having functionalities such as lightweight feel and heat retaining properties. Therefore, it is widely used to produce various hollow synthetic fibers made of acryl, polyester, nylon, and the like.

Examples of the method for producing a hollow synthetic fiber include a method in which a hollow structural body is formed during a spinning process using a spinneret, and a method in which a woven knit product is produced using fibers composed of two components and the fiber of any one of components is dissolved to form a hollow structural body. The former method is disclosed in Patent Documents 2 to 6. The latter method is disclosed in Patent Document 7.

However, in the former method, regardless of wet spinning, dry spinning or melt spinning, a large-scale device is required. Since the production method varied with a difference in a fiber material, production cost is high and skilled technique and knowledge are required, and also chemical resistance is poor. Furthermore, the above production method is a technique which can be applied only for fibrous products and it is difficult to apply for various shapes and sizes, like a film. Since it is also a technique of forming a hollow structure during the production process, it is difficult to form a hollow structure in commercially available products.

Patent Document 1: Japanese Unexamined Patent Publication (Kokai) No. 2001-248024
Patent Document 2: Japanese Unexamined Patent Publication (Kokai) No. 9-78355
Patent Document 3: Japanese Unexamined Patent Publication (Kokai) No. 2003-105627
Patent Document 4: Japanese Unexamined Patent Publication (Kokai) No. 2005-256243
Patent Document 5: Japanese Unexamined Patent Publication (Kokai) No. 2006-45720
Patent Document 6: Japanese Unexamined Patent Publication (Kokai) No. 2006-9178
Patent Document 7: Japanese Unexamined Patent Publication (Kokai) No. 2007-016356

DISCLOSURE OF THE INVENTION

Problems to be Solved by the Invention

In light of the above problems, the present invention has been made, and an object thereof is to provide a method for producing a hollow structural body which has various shapes and sizes, like a fiber and a film, and is also made of a fluorinated hydrocarbon polymer, a fluorocarbon polymer, or a polymer having a nitrogen-containing group, a silicon-containing group, an oxygen-containing group, a phosphorus-containing group or a sulfur-containing group introduced into the polymer, having a chemical resistance, and to provide a hollow structural body obtained by the method.

Means for Solving the Problems

The present inventors have intensively studied about a method for producing a hollow structural body and a hollow structural body obtained by the method so as to solve the above conventional problems. As a result, they have found that the above object can be achieved by adopting constitution shown below, and thus the present invention has been completed.

That is, in order to solve the above-mentioned problems, the present invention relates to a method for producing a hollow structural body, which comprises a fluorination treatment step of bringing a structural body made of a hydrocarbon polymer, or a polymer having a nitrogen-containing group, a silicon-containing group, an oxygen-containing group, a phosphorus-containing group or a sulfur-containing group introduced into the hydrocarbon polymer, into contact with a treating gas containing fluorine under a predetermined condition to allow the treating gas to permeate the structural body from the outer surface toward the inside thereby fluorinating the structural body excluding the center portion thereof; and a removal step of removing the center portion in an unfluorinated state.

In the above method, according to the fluorination treatment step, the structural body made of a hydrocarbon polymer, or a polymer having a nitrogen-containing group, a silicon-containing group, an oxygen-containing group, a phosphorus-containing group or a sulfur-containing group introduced into the hydrocarbon polymer is brought into contact with a treating gas containing fluorine, and the treating gas is allowed to permeate the structural body toward the inside, thereby fluorinating the structural body excluding the center portion thereof. Next, the center portion is removed to obtain an opened hollow structural body. The hollow structural body is made of a fluorinated hydrocarbon polymer, a fluorocarbon polymer, or a polymer having a nitrogen-containing group, a silicon-containing group, an oxygen-containing group, a phosphorus-containing group or a sulfur-containing group introduced into the polymer, and therefore is excellent in chemical resistance against an acidic solution of hydrofluoric acid or the like, a strong alkali solution of potassium hydroxide or the like, and an organic solvent. Since an opened hollow structure can be formed without restriction on the shape or size of the structural body made of a polymer, increase in facility cost can be suppressed.

It is preferable that a portion of the structural body made of the polymer is subjected to a step of masking for preventing fluorination due to the fluorination treatment, or a step of exposing the center portion in an unfluorinated state in the structural body after being subjected to the fluorination treatment. Therefore, since the center portion in an unfluorinated state can be exposed in the structural body after being subjected to the fluorination treatment, the center portion can be easily removed.

It is preferable that the removal step is a step of dissolving and removing the center portion by bringing a solvent, in which the polymer shows solubility and a solvent temperature is within a range from 0 to 250° C., into contact with the exposed portion of the center portion. By using a solvent in which the polymer shows solubility, only the center portion made of a hydrocarbon polymer or the like is dissolved and removed, leaving only the portion made of a fluorinated hydrocarbon polymer, a fluorocarbon polymer, or the like. Thus, the opened hollow structural body can be obtained.

It is preferable that the removal step is conducted while heating at a temperature within a range from 50 to 400° C. under an inactive gas atmosphere. Therefore, the unfluorinated center portion can be removed by firing. As a result, even when a hydrocarbon polymer excellent in chemical resistance, or a polymer having a nitrogen-containing group, a silicon-containing group, an oxygen-containing group, a phosphorus-containing group or a sulfur-containing group introduced into the polymer is used, or a solvent in which the polymer shows solubility cannot be found out, only the center portion can be removed and thus an opened hollow structural body can be obtained.

It is preferable that a pre-treatment step of heating the structural body made of the polymer under an inactive gas atmosphere under a predetermined condition is conducted before the fluorination treatment step. Therefore, since an inhibition component, which inhibits the progress of a fluorination treatment, such as moisture or a volatile component contained in the structural body made of a polymer can be removed in advance, a hollow structural body excellent in chemical resistance can be obtained.

It is preferable that a post-treatment step of heating the structural body immediately after the fluorination treatment step under a predetermined condition is conducted. Thereby, the unreacted treating gas remained in the structural body, and impurities such as hydrogen fluoride generated during the reaction and adsorbed on a surface of the structural body can be removed. By heating, fluorination can be allowed to proceed further inside the structural body and thus mechanical strength can be further improved.

It is preferred to use, as the treating gas, at least any one gas selected from the group consisting of hydrogen fluoride (HF), fluorine ($F_2$), chlorine trifluoride ($ClF_3$), sulfur tetrafluoride ($SF_4$), boron trifluoride ($BF_3$), nitrogen trifluoride ($NF_3$) and carbonyl fluoride ($COF_2$), or one prepared by diluting the gas with an inactive gas.

It is preferable that the hydrocarbon polymer is an olefin polymer, a cyclic olefin polymer, an aromatic unsaturated hydrocarbon polymer, a polar group-containing polymer, or a copolymer containing two or more these polymers.

Furthermore, in order to solve the above-mentioned problems, the present invention relates to a hollow structural body obtained by the method for producing a hollow structural body, which has an opened follow structure and is made of a fluorinated hydrocarbon polymer, a fluorocarbon polymer, or a polymer having a nitrogen-containing group, a silicon-containing group, an oxygen-containing group, a phosphorus-containing group or a sulfur-containing group introduced into the polymer.

With the above constitution, the hollow structural body is made of a fluorinated hydrocarbon polymer, a fluorocarbon polymer, or a polymer having a nitrogen-containing group, a silicon-containing group, an oxygen-containing group, a phosphorus-containing group or a sulfur-containing group introduced into the polymer, and therefore is excellent in chemical resistance against an acidic solution of hydrofluoric acid or the like, a strong alkali solution of potassium hydroxide or the like, and an organic solvent. Furthermore, the hollow structural body of the present invention may have an opened hollow structural body including a hollow portion communicating with outside, and has the high degree of freedom with respect to the shape and size. Therefore, the hollow structural body of the present invention can be applied for fibrous and film-shaped products.

It is preferable that a hollow ratio is within a range from 0.1 to 99%. The "hollow ratio" means a ratio of the cross-sectional area of the hollow portion to the entire cross-sectional area including the hollow portion in the cross section of the hollow structural body.

Effect of the Invention

According to the present invention, a hollow structural body excellent in chemical resistance and a method for producing the same can be provided easily with low cost without restriction on the shape and size.

EXPLANATION OF REFERENCES

Figure 1:
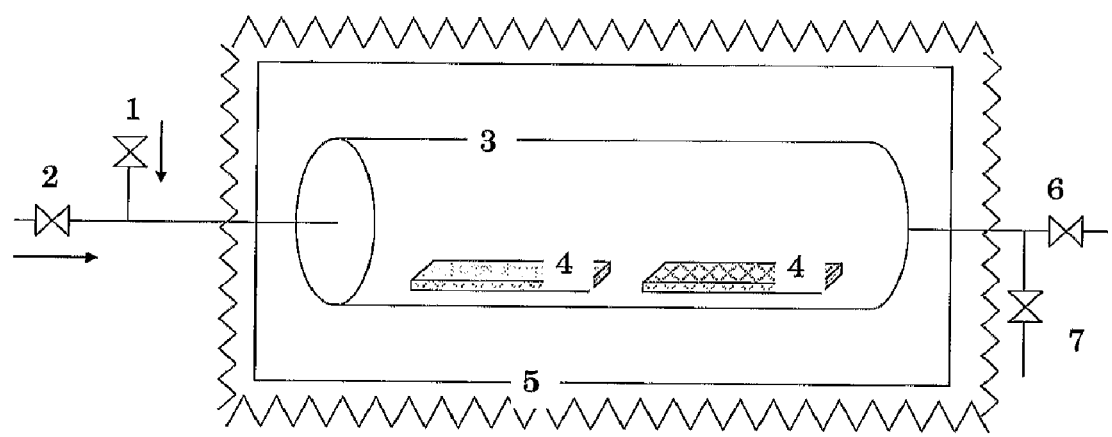
FIG. 1 is a schematic view showing one example of a reactor used in the production of a hollow structural body according to the embodiment of the present invention.

1: Inactive gas feed line
2: Fluorination gas feed line

3: Reaction vessel
4: Structural body
5: Heater
6: Exhaust line
7: Vacuum line

BEST MODE FOR CARRYING OUT THE INVENTION

Embodiments of the present invention will be explained with reference to the accompanying drawings. Provided that, unnecessary portions for explanation are omitted, and some portions are illustrated on an enlarged or reduced scale for the easier understanding of explanation.

The hollow structural body according to the present embodiment is a resin integral molded article which has an opened hollow structure and is made of a fluorinated hydrocarbon polymer, a fluorocarbon polymer, or a polymer having a nitrogen-containing group, a silicon-containing group, an oxygen-containing group, a phosphorus-containing group or a sulfur-containing group introduced into the polymer. The shape of the hollow structural body is not particularly limited to a fibrous shape and may be a film. In the case of a fibrous hollow structural body, the hollow portion is continuously provided in the fiber axial direction.

When the hollow structural body according to the present embodiment is in the form of a fiber, the thickness thereof is not particularly limited and can be appropriately set, if necessary. For example, in the case of a hollow structural body having a diameter of 100 μm, the thickness thereof is preferably within a range from 0.1 to 9.9 μm, and more preferably from 1.0 to 9.0 μm. When the thickness is less than 0.1 μm, it may be impossible to sufficiently exert a function as the hollow structural body. In contrast, when the thickness exceeds 9.9 μm, the torsion may occur as a result of deterioration of shape retention for the hollow structural body.

When the hollow structural body according to the present embodiment is in the form of a film, the thickness thereof is not particularly limited and can be appropriately set, if necessary. For example, in the case of the hollow structural body in which the total thickness of a film is 100 μm, the thickness of the coating film is preferably within a range from 0.1 to 9.9 μm, and more preferably from 1.0 to 9.0μ. When the thickness is less than 0.1 μm, it may be impossible to sufficiently exert a function as the hollow structural body. In contrast, when the thickness exceeds 9.9 μm, shape retention for the hollow structural body may deteriorate.

The fluorinated hydrocarbon polymer means a polymer in which a portion of a hydrocarbon polymer described hereinafter is fluorinated, and the fluorocarbon polymer means a polymer in which a hydrocarbon polymer is completely fluorinated.

The hollow structural body according to the present embodiment is made of a fluorinated hydrocarbon polymer, a fluorocarbon polymer, or a polymer having a nitrogen-containing group, a silicon-containing group, an oxygen-containing group, a phosphorus-containing group or a sulfur-containing group introduced into the polymer, and therefore exhibits excellent chemical resistance against an acidic solution of hydrofluoric acid, sulfuric acid, hydrochloric acid, nitric acid, hydrogen peroxide water, or the like, or a mixed acid containing two or more these acidic solutions. It also exhibits excellent chemical resistance against a strong alkali solution of potassium hydroxide, sodium hydroxide, or the like. Furthermore, it exhibits excellent chemical resistance against an organic solvent such as an aromatic solvent, a cyclic solvent or a chain solvent.

The hollow ratio of the hollow structural body is preferably within a range from 0.1 to 99%, and more preferably from 1 to 90%. When the hollow ratio is less than 0.1%, it may be impossible to sufficiently exert a function as the hollow structural body. In contrast, when the hollow ratio exceeds 99%, the torsion may occur as a result of deterioration of shape retention for the hollow structural body.

Next, the method for producing a hollow structural body according to the present embodiment will be explained. In the production method, at least a fluorination treatment step of a structural body made of a hydrocarbon polymer, or a polymer having a nitrogen-containing group, a silicon-containing group, an oxygen-containing group, a phosphorus-containing group or a sulfur-containing group introduced into the polymer, and a removal step of removing the unfluorinated center portion are conducted.

The hydrocarbon polymer is not particularly limited and includes, for example, an olefin polymer, a cyclic olefin polymer, an aromatic unsaturated hydrocarbon polymer, a polar group-containing polymer, or a copolymer containing two or more these polymers. More specifically, examples of the olefin polymer include polyethylene, propylene, polybutene-1, an ethylene-propylene copolymer, an ethylene-butene-1 copolymer, an ethylene-hexene-1 copolymer and a propylene-butene-1 copolymer. Examples of the aromatic hydrocarbon polymer include polystyrene and a styrene-divinylbenzene copolymer. Examples of the polar group-containing polymer include polyvinyl chloride, polycarbonate, polymethyl methacrylate, polyethylene terephthalate, polyacrylonitrile, or a copolymer containing two or more these polymers. Examples of the cyclic olefin polymer include a norbornene polymer, a dicyclopentadiene polymer, a tetracyclododecane polymer, an ethyltetracyclododecene polymer, an ethylidene-tetracyclododecene polymer, a tertacyclo[$7.4.0.1^{10,13}.0^{2,7}$] trideca-2,4,6,11-tetraene polymer, a norbornene-based polymer such as 1,4-methano-1,4,4a,9a-tetrahydrofluorene, a cyclobutene polymer, a cyclopentene polymer, a cyclohexene polymer, a 3,4-dimethylcyclopentene polymer, a 3-methylcyclohexene polymer, a 2-(2-methylbutyl)-1-cyclohexene polymer, a cyclooctene polymer, a cycloheptene polymer, a cyclopentadiene polymer, a cyclohexadiene polymer, or a copolymer containing two or more these polymers. Also, a copolymer containing at least one monomer which composes the olefin polymer, cyclic olefin polymer, aromatic hydrocarbon polymer and polar group-containing polymer, for example, an ethylene-methyl methacrylate copolymer, an ethylene-styrene copolymer and an ethylene-2-norbornene copolymer are exemplified. Also, natural fibers such as rayon, cupra, wool, silk and cellulose are exemplified. Furthermore, synthetic fibers such as acryl, polyester, polyurethane and nylon are exemplified. Among these polymers, preferred are those which can be easily substituted with fluorocarbon by a fluorination treatment.

In the present invention, it is also possible to apply a polymer having a nitrogen-containing group, a silicon-containing group, an oxygen-containing group, a phosphorus-containing group or a sulfur-containing group for the hydrocarbon polymer. The nitrogen-containing group is not particularly limited and includes, for example, an alkylamino group such as an amino, methylamino, dimethylamine, diethylamino, dipropylamino, dibutylamino or dicyclohexylamino group, an arylamino group such as a phenylamino, diphenylamino, ditolylamino, dinaphthylamino or methylphenylamino group, or an alkylarylamino group. The silicon-containing group is not particularly limited and includes, for example, a methylsilyl group, a phenylsilyl group, a dimethylsilyl group, a diethylsilyl group, a diphenylsilyl group, a trimethylsilyl group, a triethylsilyl group, a tripropylsilyl group, a tricyclohexylsilyl group, a triphenylsilyl group, a dimethylphenylsilyl group, a methyldiphenylsilyl group, a tritolylsilyl group and a trinaphthylsilyl group. The oxygen-containing group is not particularly limited and includes, for example, an alkoxy group such as a methoxy, ethoxy, propoxy or butoxy group, an allyloxy group such as a phenoxy, methylphenoxy, dimethylphenoxy or naphthoxy group, an arylalkoxy group such as a phenylmethoxy or phenylethoxy group, and an ether group. The phosphorus-containing group is not particularly limited and includes, for example, a dimethylphosphino group and a dipheylphosphino group. The sulfur-containing group is not particularly limited and includes, for example, a thiol group, a sulfonate group and a sulfinate group.

The structural body made of the hydrocarbon polymer, or a polymer having a nitrogen-containing group, a silicon-containing group, an oxygen-containing group, a phosphorus-containing group or a sulfur-containing group introduced into the polymer is preferably subjected to a predetermined pre-treatment step in advance. More specifically, the structural body is preferably subjected to a pre-treatment step of heating under an inactive gas atmosphere. The inhibition component, which inhibits the progress of a fluorination treatment, such as moisture or a volatile component contained in the structural body can be removed in advance by conducting the pre-treatment step. As a result, a hollow structural body having further improved chemical resistance can be obtained.

The pre-treatment step is conducted, for example, by placing the structural body 4 in a reaction vessel 3 and introducing the inactive gas into the structural body 4 through an inactive gas feed line 1 (see FIG. 1). The inactive gas is not particularly limited as long as it is one other than a gas which reacts with the structural body thereby exerting adverse effects, or a gas containing impurities which exerts adverse effects. For example, dry air, nitrogen, argon, helium, neon, krypton and xenon can be used alone or in combination. There is no particular limitation on purity of the inactive gas. However, the content of impurities which exerts adverse effects is preferably 100 ppm or less, more preferably 10 ppm or less, and particularly preferably 1 ppm or less.

Depending on the structural body, moisture and oxygen among impurities contained in the inactive gas may serve as a factor which inhibits conversion into fluorocarbon thereby decreasing the mechanical strength of the hollow structural body. Therefore, the concentration of the moisture and oxygen existing in the inactive gas to be used is preferably 100 ppm or less, more preferably 10 ppm or less, and particularly preferably 1 ppm or less. As a matter of course, dry air cannot be used when oxygen exerts adverse effects.

The reaction vessel 3 is not particularly limited and those made of stainless steel, aluminum or nickel can be used.

The structural body 4 is heated by a heater 5. The heating temperature may be appropriately set according to physical properties of a hydrocarbon polymer, or a polymer having a nitrogen-containing group, a silicon-containing group, an oxygen-containing group, a phosphorus-containing group or a sulfur-containing group introduced into the polymer and is usually within a range from 60 to 160° C., and preferably from 60 to 120° C. The heating time may be appropriately set according to physical properties of the polymer and is usually within a range from 1 to 600 minutes, and preferably from 1 to 360 minutes. The structural body 4 is preferably heated while monitoring the moisture content using a dew-point meter.

Furthermore, the structural body 4 may be heated under reduced pressure and the pressure is not particularly limited, and is preferably 10 Pa or less, and preferably 1 Pa or less.

The fluorination treatment step is a step in which a structural body made of a hydrocarbon polymer, or a polymer having a nitrogen-containing group, a silicon-containing group, an oxygen-containing group, a phosphorus-containing group or a sulfur-containing group introduced into the polymer is brought into contact with a treating gas containing fluorine, and thus a portion other than the center portion of the structural body is fluorinated. As the treating gas, at least any one gas selected from the group consisting of hydrogen fluoride (HF), fluorine ($F_2$), chlorine trifluoride ($ClF_3$), sulfur tetrafluoride ($SF_4$), boron trifluoride ($BF_3$), nitrogen trifluoride ($NF_3$) and carbonyl fluoride ($COF_2$), or one prepared by diluting the gas with an inactive gas can be used. The inactive gas used for dilution is not particularly limited as long as it is one other than a gas which reacts with the treating gas thereby exerting adverse effects, and a gas which reacts with the structural body thereby exerting adverse effects or a gas containing impurities which exerts adverse effects. For example, dry air, nitrogen, argon, helium, neon, krypton and xenon can be used alone or in combination. There is no particular limitation on purity of the inactive gas. However, the content of impurities which exerts adverse effects is preferably 100 ppm or less, more preferably 10 ppm or less, and particularly preferably 1 ppm or less.

The fluorination treatment is conducted, for example, in the following manner. First, a valve of the inactive gas feed line 1 shown in FIG. 1 is closed, then a valve of a vacuum line 7 is opened and the reaction vessel 3 is under reduced pressure. The pressure is not particularly limited and is preferably 10 Pa or less, and more preferably 1 Pa or less. If necessary, the inside of the reaction vessel 3 may be pre-heated or pre-cooled.

After the pressure was reduced to a predetermined pressure, the valve of the vacuum line 7 is closed, and then the valves of the inactive gas feed line 1 and a fluorination gas feed line 2 are opened. Whereby, an inactive gas is mixed with a fluorination gas in the line and the resultant mixed gas is fed to the reaction vessel 3 as the treating gas.

There is no particular limitation on the concentration and flow rate of the fluorination gas. However, the reaction between the fluorination gas and a hydrocarbon polymer, or a polymer having a nitrogen-containing group, a silicon-containing group, an oxygen-containing group, a phosphorus-containing group or a sulfur-containing group introduced into the polymer may explosively occur at the initial stage. Therefore, it is important that the concentration and flow rate of the fluorination gas be properly set at the initial stage of the reaction. That is, depending on the progress of the reaction, the concentration and flow rate may appropriately increase or decrease and the concentration of the fluorination gas can be usually set within a range from 0.001 to 100%. At the initial stage of the reaction, the concentration of the fluorination gas is preferably set within a range from 0.001 to 30%, more preferably from 0.001 to 20%, and particularly preferably from 0.001 to 10%, so as to mildly conduct the reaction between the polymer and the fluorination gas.

The concentration of the fluorination gas in the treating gas can be adjusted depending on the flow rate of the gases to be fed trough the inactive gas feed line 1 and the fluorine gas feed line 2. The fluorination gas may be continuously fed under normal pressure, increased pressure or reduced pressure, or enclosed under normal pressure, increased pressure or reduced pressure.

From a view point of mildly conducting the reaction between a hydrocarbon polymer, or a polymer having a nitrogen-containing group, a silicon-containing group, an oxygen-containing group, a phosphorus-containing group or a sulfur-containing group introduced into the polymer and the fluorination gas at the initial stage, the temperature of the polymer is set at a low temperature at the initial stage of the reaction and then the temperature may be raised continuously or intermittently depending on the progress of the reaction. Specifically, the reaction temperature is preferably within a range from −50 to 250° C., and more preferably from −20 to 200° C. When the reaction temperature is lower than −50° C., the structural body made of a polymer is not sufficiently fluorinated to obtain a hollow structural body having a thin thickness and a low mechanical strength. In contrast, when the reaction temperature is higher than 250° C., a hollow structure may not be obtained since the structural body made of a polymer is completely fluorinated, including the center portion.

The time (reaction time) of the fluorination treatment is not particularly limited and is usually within a range from 1 to 600 minutes, preferably from 1 to 300 minutes, and still more preferably from 1 to 150 minutes. When the reaction time is less than 1 minute, a hydrocarbon polymer, or a polymer having a nitrogen-containing group, a silicon-containing group, an oxygen-containing group, a phosphorus-containing group or a sulfur-containing group introduced into the polymer may not be sufficiently fluorinated to obtain a hollow structural body having a thin thickness and a low mechanical strength. In contrast, when the reaction time exceeds 600 minutes, a hollow structure may not be obtained since the structural body made of a polymer is completely fluorinated, including the center portion.

The thickness of the hollow structural body can be controlled by appropriately setting the concentration of the fluorination gas, the reaction temperature and the reaction time, if necessary. The thickness can be increased when each of these parameters is increased, while the thickness can be decreased when each of these parameters is decreased.

The treating gas is brought into contact with a hydrocarbon polymer, or a polymer having a nitrogen-containing group, a silicon-containing group, an oxygen-containing group, a phosphorus-containing group or a sulfur-containing group introduced into the polymer and, after a lapse of a predetermined time, the valve of the fluorination gas feed line 2 is closed and the inactive gas is continuously fed through the inactive gas feed line 1, and thus the treating gas within the reaction vessel 3 is replaced by the only inactive gas.

Subsequently, the structural body after being subjected to the fluorination treatment is heated by using a heater (post-treatment step). This heat treatment enables the removal of the remaining fluorination gas not completely reacted with a hydrocarbon polymer, or a polymer having a nitrogen-containing group, a silicon-containing group, an oxygen-containing group, a phosphorus-containing group or a sulfur-containing group introduced into the polymer in the structural body, and impurities generated during the reaction and adsorbed on the surface of the structural body. The heat treatment also enables the progress of fluorination to the inside of the structural body, and thus the mechanical strength can be further increased. The heating temperature is preferably set to the temperature higher than the fluorination treatment temperature. The heating temperature may be appropriately set depending on physical properties of a fluorinated hydrocarbon polymer, a fluorocarbon polymer, or a polymer having a nitrogen-containing group, a silicon-containing group, an oxygen-containing group, a phosphorus-containing group or a sulfur-containing group introduced into the polymer, and is preferably within a range from 50 to 250° C., and more preferably from 50 to 200° C. The reaction time is preferably from 1 to 600 minutes, and more preferably from 1 to 360 minutes. When the reaction temperature is lower than 50° C. or the reaction time is less than 1 minute, the fluorination gas or impurities may not be sufficiently removed. In contrast, when the reaction temperature is higher than 250° C. or the reaction time is more than 600 minutes, there may arise such a problem that the mechanical strength of a fluorinated hydrocarbon polymer, a fluorocarbon polymer, or a polymer having a nitrogen-containing group, a silicon-containing group, an oxygen-containing group, a phosphorus-containing group or a sulfur-containing group introduced into the polymer decreases.

After the fluorination treatment step, the structural body made of a fluorinated hydrocarbon polymer, a fluorocarbon polymer, or a polymer having a nitrogen-containing group, a silicon-containing group, an oxygen-containing group, a phosphorus-containing group or a sulfur-containing group introduced into the polymer is taken out from the reaction vessel 3. Next, when the center portion of the structural body in the unfluorinated state is not exposed, processing such as cutting of a portion of the structural body is conducted so as to expose the center portion by the following reason that when the unfluorinated unreacted center portion is not exposed outside, the center portion cannot be removed in a removal step described hereinafter. Before the fluorination treatment, a portion of the structural body made of a hydrocarbon polymer, or a polymer having a nitrogen-containing group, a silicon-containing group, an oxygen-containing group, a phosphorus-containing group or a sulfur-containing group introduced into the polymer may be subjected top masking in advance. In this case, a mask is removed before the removal step described hereinafter. The masking method includes, for example, a method of coating a portion, not to be reacted, with a surface protective material such as a masking tape.

Next, the removal step of removing the center portion in the unfluorinated state is conducted. The removal step is conducted by a method of immersing a structural body made of a fluorinated hydrocarbon polymer, a fluorocarbon polymer, or a polymer having a nitrogen-containing group, a silicon-containing group, an oxygen-containing group, a phosphorus-containing group or a sulfur-containing group introduced into the polymer in a predetermined solvent. The solvent is not particularly limited and may be appropriately set depending on the kind of a hydrocarbon polymer, or a polymer having a nitrogen-containing group, a silicon-containing group, an oxygen-containing group, a phosphorus-containing group or a sulfur-containing group introduced into the polymer. Specifically, an organic solvent such as xylene is exemplified for polyethylene and a polypropylene polymer. Also, an organic solvent such as cyclohexane or cyclooctane is exemplified for a norbornene polymer.

In the step of immersing the polymer after being subjected to the fluorination treatment in a solvent to remove the center portion, the solvent may be heated or the solvent may be heated under reflux by providing with a reflux condenser. The step may be conducted under atmospheric pressure, increased pressure or reduced pressure. However, when the step is conducted under increased pressure, the unfluorinated center portion can be dissolved and removed rapidly. The solvent temperature is not particularly limited and can be appropriately set depending on a boiling point of an organic solvent to be used. Specifically, the solvent temperature is preferably within a range from 0 to 250° C., and more preferably from 0 to 150° C. When the solvent temperature is lower than 0° C., it may become difficult to rapidly dissolve and remove the center portion. In contrast, when the solvent temperature is higher than 250° C., there arises a problem that a fluorinated hydrocarbon polymer, a fluorocarbon polymer, or a polymer having a nitrogen-containing group, a silicon-containing group, an oxygen-containing group, a phosphorus-containing group or a sulfur-containing group introduced into the polymer itself is dissolved. While the heating temperature is within a range from 60 to 160° C. in the pre-treatment step of the structural body, the heating temperature can be increased to 250° C. in the present step. This means that heat resistance can be improved by the fluorination treatment of the structural body. The immersion time can also be appropriately set depending on the solubility of a hydrocarbon polymer, or a polymer having a nitrogen-containing group, a silicon-containing group, an oxygen-containing group, a phosphorus-containing group or a sulfur-containing group introduced into the polymer, the shape and size of the structural body, and the kind of the solvent.

When a solvent in which the polymer shows solubility cannot be found out, heating under an inactive gas atmosphere may also be conducted as the removal step. The unfluorinated center portion can be removed due to melting or firing also in this method. The mechanical strength of the portion converted into a fluorinated hydrocarbon polymer or a fluorocarbon polymer as a result of the fluorination treatment can be further increased.

The heating temperature can be appropriately set depending on physical properties of a hydrocarbon polymer, or a polymer having a nitrogen-containing group, a silicon-containing group, an oxygen-containing group, a phosphorus-containing group or a sulfur-containing group introduced into the polymer and the shape and size of the structural body. Specifically, the heating temperature is preferably from 50 to 400° C., and more preferably from 100 to 300° C. While the heating temperature is within a range from 60 to 160° C. in the pre-treatment step of the structural body, the heating temperature can be increased to 400° C. in the present step. This means that heat resistance can be improved by the fluorination treatment of the structural body. Also, the heating time can also be set by the reason similar to the case of the heating temperature. Specifically, the heating time is preferably from 30 to 200 minutes. After removal of the center portion by heating, the hollow structural body is cooled to room temperature. This step may be conducted under atmospheric pressure, increased pressure or reduced pressure.

The inactive gas is not particularly limited as long as it is one other than a gas which reacts with the structural body thereby exerting adverse effects, or a gas containing impurities which exerts adverse effects. For example, dry air, nitrogen, argon, helium, neon, krypton and xenon can be used alone or in combination. Herein, the content of impurities which exerts adverse effects is preferably 100 ppm or less, more preferably 10 ppm or less, and particularly preferably 1 ppm or less.

According to the above method, a hollow structural body, which has an opened follow structure and is made of a fluorinated hydrocarbon polymer, a fluorocarbon polymer, or a polymer having a nitrogen-containing group, a silicon-containing group, an oxygen-containing group, a phosphorus-containing group or a sulfur-containing group introduced into the polymer, can be obtained. A hydrocarbon polymer, or a polymer having a nitrogen-containing group, a silicon-containing group, an oxygen-containing group, a phosphorus-containing group or a sulfur-containing group introduced into the polymer according to the present embodiment can be formed into fiber to obtain a hollow fiber. A fiber structural body produced by using the hollow fiber as a raw material is excellent in lightweight properties and chemical resistance compared with a conventional one. The present hollow structural body can also be applied for medical appliances such as catheter.

EXAMPLES

Below, preferred examples of the present invention are explained in detail. However, materials, addition amounts, and the like described in these examples are not intended to limit the scope of the present invention, and are only examples for explanation as long as there is no description of limitation in particular.

Example 1

As shown in FIG. 1, a fibrous structural body 4 made of a cyclic olefin polymer (manufactured by ZEON CORPORATION under the trade name of ZEONOA 1060) was charged into a reaction vessel 3 and a valve of a vacuum line 7 was opened, and then evacuation was conducted until the pressure in the reaction vessel 3 was reduced to 1 Pa or less.

Next, the valve of the vacuum line 7 was closed and a valve of an inactive gas feed line 1 was opened, and a nitrogen gas was introduced into the reaction vessel 3. When the pressure in the reaction vessel 3 showed an atmospheric pressure, a valve of an exhaust line 6 was opened and a heat treatment was conducted at a nitrogen flow rate of 1.5 L/min at 90° C. for 1 hour. A temperature rise rate was set at 2.0° C./min (pre-treatment step).

After a lapse of a predetermined time, the inside of the reaction vessel 3 was cooled to 30° C. and the valves of the inactive gas feed line 1 and the exhaust line 6 were closed, whereby, the inside of the reaction vessel 3 was brought into a closed state. Thereafter, the valve of the vacuum line 7 was opened and evacuation was conducted until the pressure in the reaction vessel 3 was reduced to 1 Pa or less.

Next, the valve of the vacuum line 7 was closed and the valves of the inactive gas feed line 1 and a fluorination gas feed line 2 were simultaneously opened, and then a 5% fluorine gas diluted with a nitrogen gas so as to achieve the concentration of a fluorine gas of 5% and a total flow rate of 100 cc/min was introduced into the reaction vessel 3 until the pressure reached an atmospheric pressure.

When the pressure showed the atmospheric pressure, the valves of the inactive gas feed line 1 and the fluorination gas feed line 2 were simultaneously closed, whereby, the inside of the reaction vessel 3 was brought into a closed state, followed by retention for 1 hour (fluorination treatment step).

After a lapse of a predetermined time, using a heater 5, the structural body 4 was heated to 90° C. and, after reaching 90° C., the structural body was retained for 1 hour (fluorination treatment step). A temperature rise rate was set at 0.1° C./min.

Next, the inside of the reaction vessel 3 was cooled to room temperature and the valves of the inactive gas feed line 1 and the exhaust line 6 were opened. After replacing the fluorine gas within the reaction vessel 3 by a nitrogen gas, the valves of the inactive gas feed line 1 and the exhaust line 6 were closed, the valve of the vacuum line 7 was opened, and then evacuation was conducted until the pressure in the reaction vessel 3 was reduced to 1 Pa or less.

Next, the valve of the vacuum line 7 was closed and the valve of the inactive gas feed line 1 was opened, and a nitrogen gas was introduced into the reaction vessel 3 at a flow rate of 1.5 L/min. When the pressure in the reaction vessel 3 showed the atmospheric pressure, the valve of the exhaust line 6 was opened, followed by heating at a temperature rise rate of 2° C./min using the heater 5. After reaching 95° C., the structural body was retained for 1 hour. After a lapse of a predetermined time, the inside of the reaction vessel was cooled to room temperature, and the structural body 4 was taken out (post-treatment step).

Subsequently, the structural body 4 was cut into pieces measuring 20 mm×20 mm, followed by immersion in 50 g of cyclooctane (99.8%) at room temperature for 24 hours. Next, the structural body 4 was taken out, washed with isopropyl alcohol, dried at 60° C. for 5 hours and then cooled to room temperature. Thus, a hollow structural body of present Example 1 was produced.
<Analysis>

Figure 2:
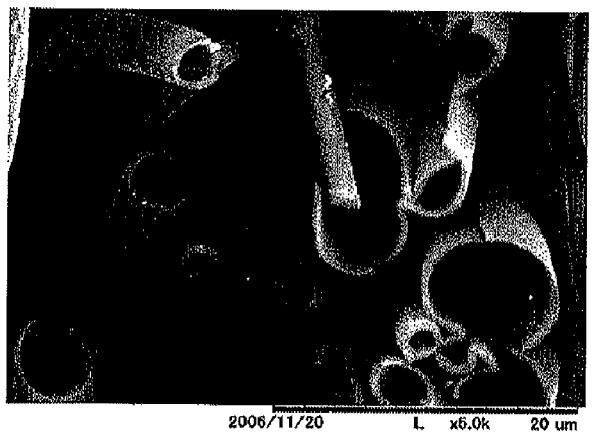
FIG. 2 is a SEM micrograph of a hollow structural body in present Example 1.

The hollow structural body was cut into pieces measuring 10 mm×10 mm and a cut surface was observed by a scanning electron microscope (SEM). As a result, it was a hollow structural body (see FIG. 2). The film thickness was about 1.0 μm.

Figure 3:
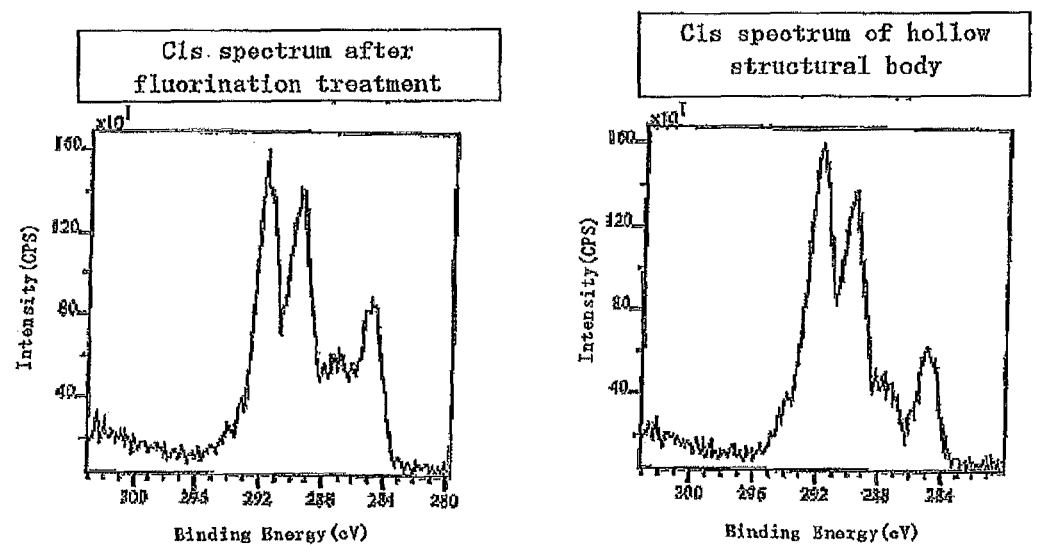
FIG. 3 is an XPS spectrum of a hollow structural body in present Example 1.

Surface analysis of the structural body immediately after being subjected to a fluorination treatment and the hollow structural body was conducted by using an X-ray photoelectron spectroscopy (XPS). As a result, there was not a large difference in surface composition between both structural bodies. It was also found that both structural bodies were made of a fluorinated hydrocarbon polymer (see FIG. 3). Furthermore, a hollow ratio measured by the method described hereinafter was 50%.

Example 2

First, a fluorination treatment was conducted in the same manner as in Example 1, except that a fibrous structural body 4 made of an olefin polymer (Polypropylene SLFD 50125: manufactured by NKK).

Next, the structural body after being subjected to the fluorination treatment was cut into pieces measuring 20 mm×20 mm, followed by immersion in 50 g of xylene (80%) at 110° C. for 24 hours. Next, the structural body was taken out, washed with isopropyl alcohol, dried at 90° C. for 5 hours and then cooled to room temperature. Thus, a hollow structural body of present Example 2 was produced.
<Analysis>

Figure 5:
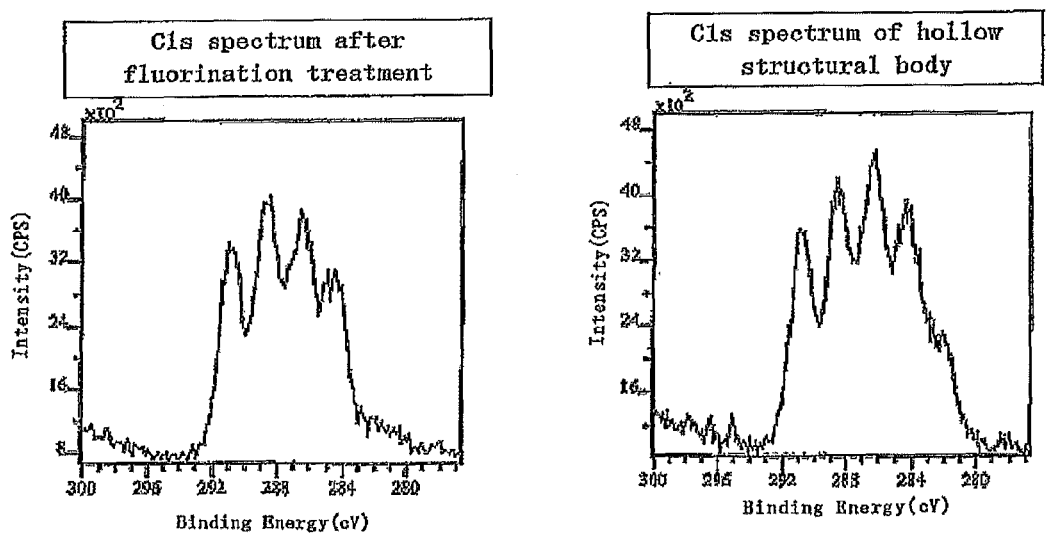
FIG. 5 is an XPS spectrum of a hollow structural body in present Example 2.
Figure 4:
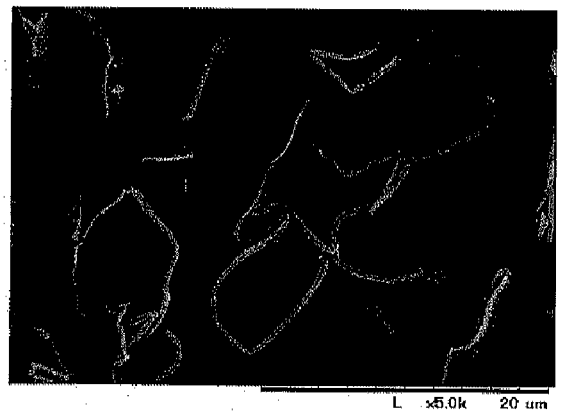
FIG. 4 is a SEM micrograph of a hollow structural body in present Example 2.

The measurement of the thickness and surface analysis of the hollow structural body were conducted in the same manner as in Example 1. As a result, the film thickness was about 1.0 μm (see FIG. 4). It was also found that, regarding surface analysis, the surface composition of the structural body immediately after being subjected to a fluorination treatment was almost the same as that of the hollow structural body, and that both structural bodies were made of a fluorinated hydrocarbon polymer (see FIG. 5). Furthermore, the hollow ratio measured by the method described hereinafter was 60%.

Example 3

First, in the same manner as in Example 2, a fluorination treatment was conducted. Next, the structural body was cut into pieces measuring 20 mm×20 mm and heated to 300° C. in a nitrogen gas atmosphere at a temperature rise rate of 2.5° C./min. Furthermore, the structural body was fired in an electric furnace at 300° C. for 1 hour and then cooled to room temperature. Thus, a hollow structural body of present Example 3 was produced.
<Analysis>

Figure 6:
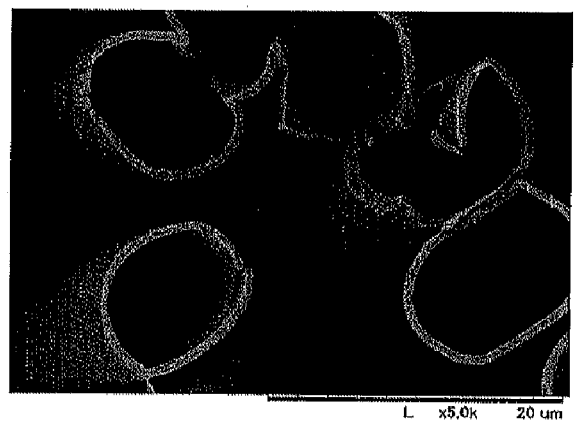
FIG. 6 is a SEM micrograph of a hollow structural body in present Example 3.
Figure 7:
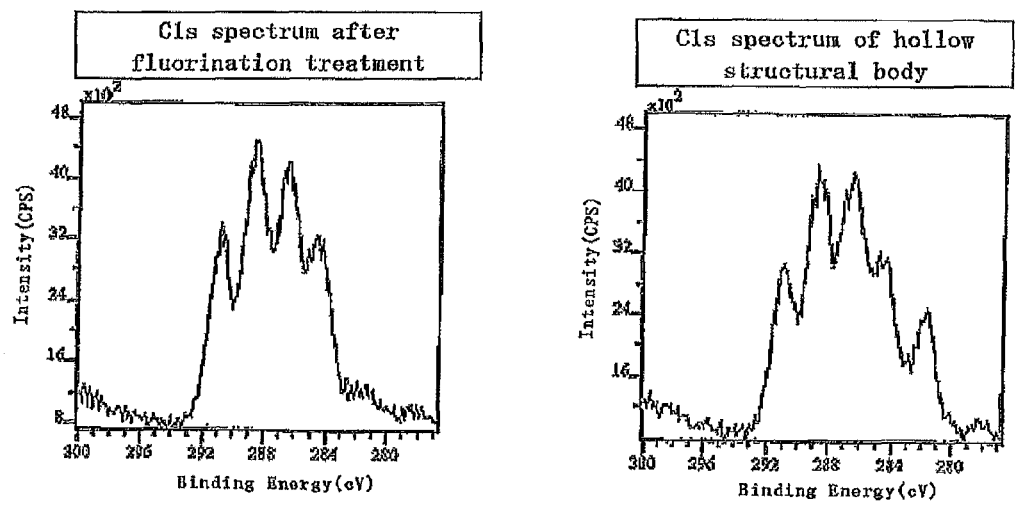
FIG. 7 is an XPS spectrum of a hollow structural body in present Example 3.

The measurement of the thickness and surface analysis of the hollow structural body were conducted in the same manner as in Example 1. As a result, the film thickness was about 1.0 μm (see FIG. 6). It was also found that, regarding surface analysis, the surface composition of the structural body immediately after being subjected to a fluorination treatment was almost the same as that of the hollow structural body, and that both structural bodies were made of a fluorinated hydrocarbon polymer (see FIG. 7). Furthermore, the hollow ratio measured by the method described hereinafter was 70%.

Example 4

A fluorination treatment was conducted in the same manner as in Example 1, except that the structural body was retained at 30° C. for 1 hour in a state where a fluorine gas was allowed to continuously flow in the fluorination treatment, followed by heating to 90° C. at a temperature rise rate of 0.3° C./min and further retention for 1 hour.

In the same manner as in Example 1, the structural body was immersed in cyclooctane, then taken out, and washed with isopropyl alcohol and dried. Thus, a hollow structural body of present Example 4 was produced.
<Analysis>

Figure 8A:
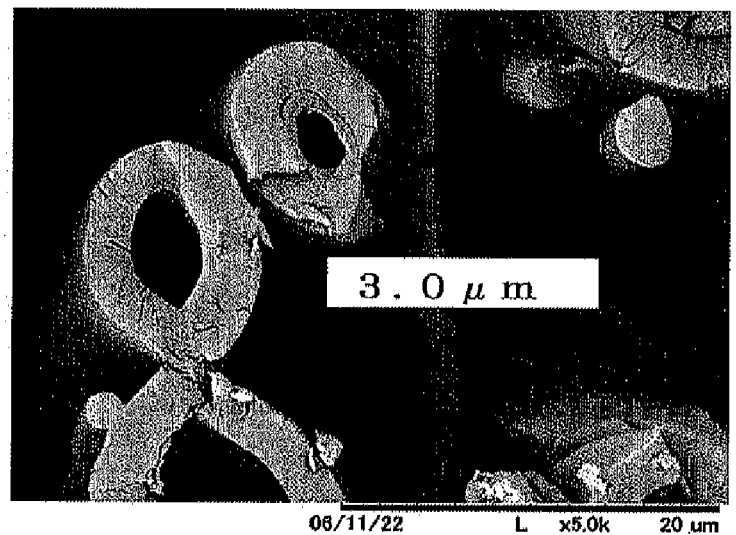
FIG. 8(*a*) is a SEM micrograph of a hollow structural body in present Example 4 and FIG. 8(*b*) is a comparative SEM micrograph of a hollow structural body in present Example 1.
Figure 8B:
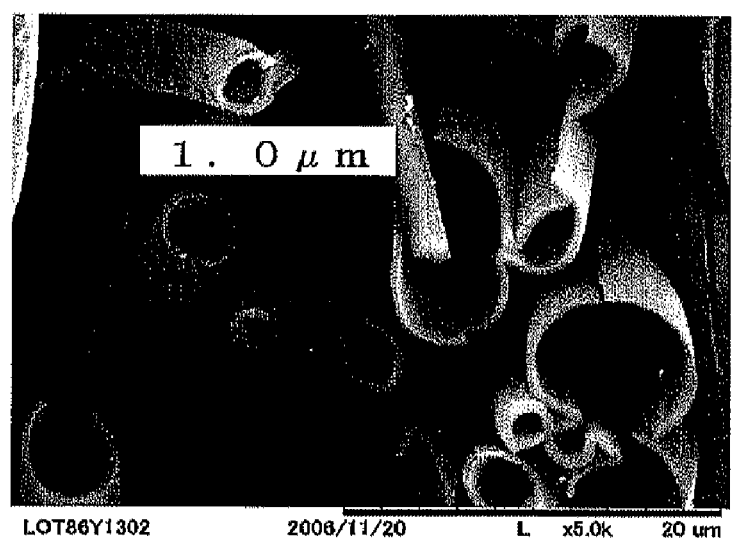

The measurement of the thickness and surface analysis of the hollow structural body were conducted in the same manner as in Example 1. As a result, the film thickness of the hollow structural body produced in Example 4 was about 3.0 μm (see FIG. 8($a$)). When compared with the hollow structural body produced in Example 1 (see FIG. 8($b$)), the hollow structural body of the present Example had a hollow ratio of about 2/5. Furthermore, a hollow ratio of the hollow structural body of the present Example measured by the method described hereinafter was 20%.

Example 5

A fluorination treatment was conducted in the same manner as in Example 1, except that a fibrous structural body 4 made of polyester (manufactured by Asahi Kasei Corporation under the trade name of Asahi Kasei ELTAS).

Next, the structural body was cut into pieces measuring 10 mm×10 mm and heated to 200° C. in a nitrogen gas atmosphere at a temperature rise rate of 2.5° C./min. Furthermore, the structural body was fired in an electric furnace at 200° C. for 6 hours and then cooled to room temperature. Thus, a hollow structural body of present Example 5 was produced.
<Analysis>

Figure 10:
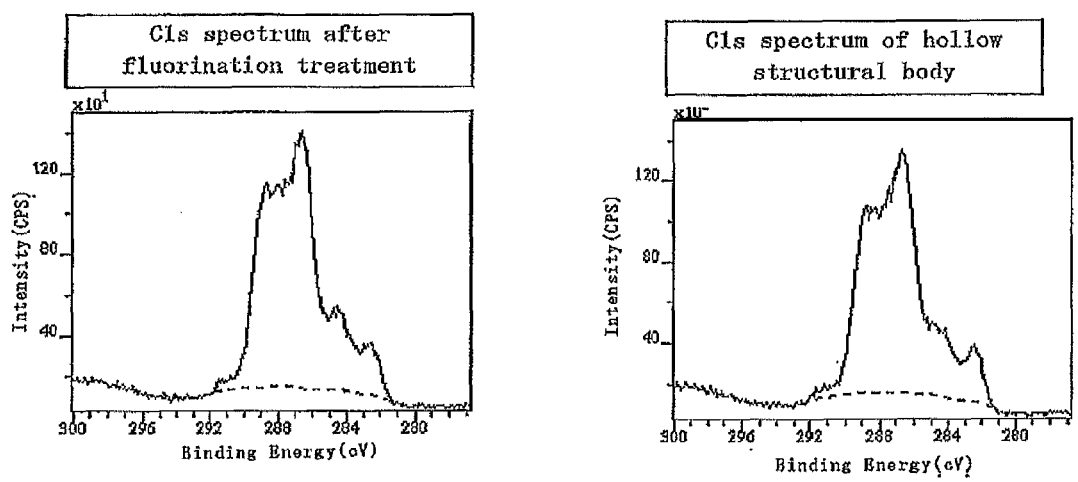
FIG. 10 is an XPS spectrum of a hollow structural body in present Example 5.
Figure 9:
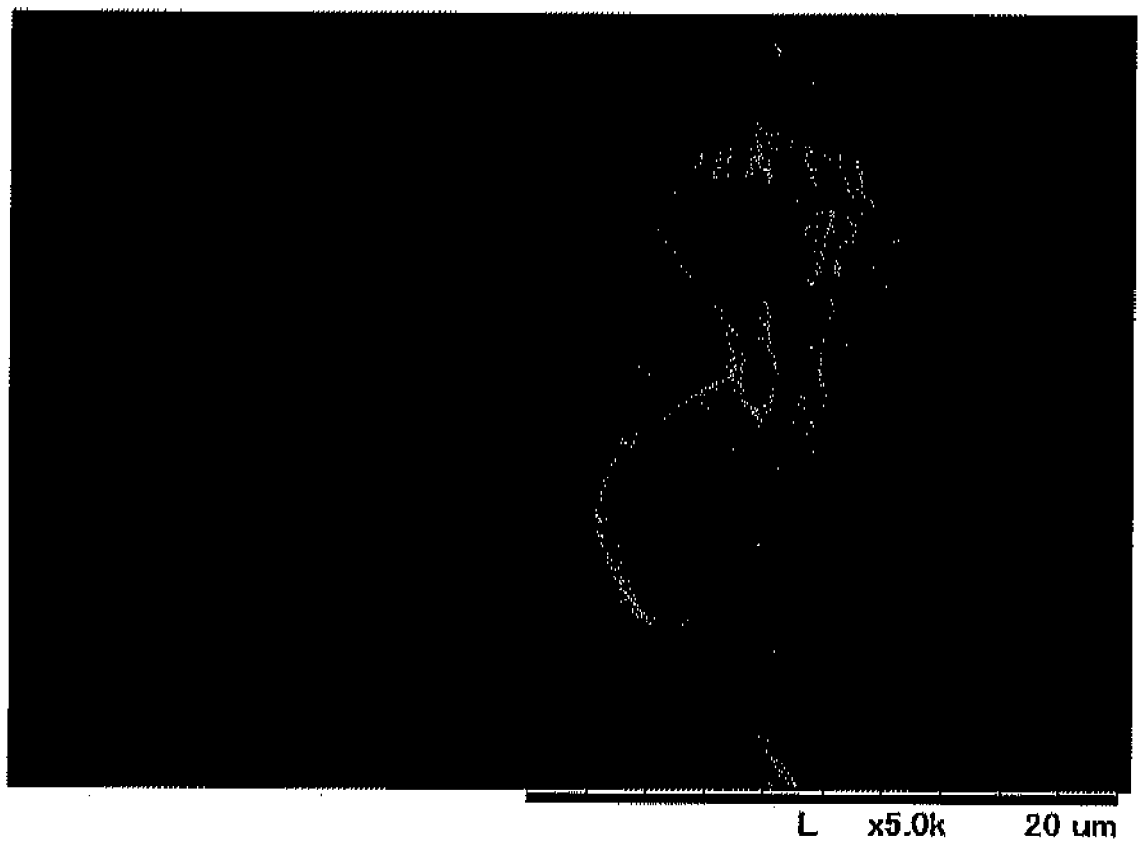
FIG. 9 is a SEM micrograph of a hollow structural body in present Example 5.

The measurement of the thickness and surface analysis of the hollow structural body were conducted in the same manner as in Example 1. As a result, the film thickness of the hollow structural body produced in Example 5 was about 1.0 μm (see FIG. 9). When compared with the hollow structural body produced in Example 1, the hollow structural body of the present Example had the similar hollow ratio. It was also found that, regarding surface analysis, the surface composition of the structural body immediately after being subjected to a fluorination treatment was almost the same as that of the hollow structural body, and that both structural bodies were made of a fluorinated hydrocarbon polymer (see FIG. 10). Furthermore, a hollow ratio measured by the method described hereinafter was 50%.
(Measurement of Hollow Ratio)

A hollow ratio of the hollow structural body was measured in the following manner. After taking a micrograph of a cross-sectional shape of the hollow structural body by an electron microscope (magnification: ×5,000), the micrograph was traced and the portion corresponding to the entire spun yarn including a hollow portion was cut, and then the mass (A) was measured. After the measurement, the portion corresponding to the hollow portion was cut and the mass (B) was measured.

This operation was conducted with respect to 10 samples. Average values of A and B were calculated and these values were substituted into the following equation to obtain a hollow ratio of the hollow structural body.

$$\text{Hollow ratio (\%)} = (B/A) \times 100 \quad \text{[Equation 1]}$$

The invention claimed is:

1. A method for producing a fluorinated hollow structural body, said method comprising the steps of:

providing a non-hollow structural body made of a hydrocarbon polymer, wherein said non-hollow structural body is formed from an outer surface and a center portion, wherein said hydrocarbon polymer forms said outer surface and said center portion, and wherein said hydrocarbon polymer optionally has a nitrogen-containing group, a silicon-containing group, an oxygen-containing group, a phosphorus-containing group, or a sulfur-containing group;

said non-hollow structural body into contact with a treating gas containing fluorine under a predetermined processing condition to allow the treating gas to permeate the structural body from the outer surface toward the center portion and to fluorinate the structural body except for the center portion thereof;

exposing the unfluorinated center portion after said fluorination treatment; and removing the exposed, unfluorinated center portion by dissolving or by the application of heat, thereby forming the fluorinated hollow structural body, wherein in order to remove the unfluorinated center portion, the method includes one of the following steps:

masking a portion of the exposed outer surface of the non-hollow structural body before said fluorination treatment in order to prevent fluorination at the masked portion due to said fluorination treatment, and subsequently removing said masking after said fluorination treatment, or cutting to expose the unfluorinated center portion after said fluorination treatment.

2. The method for producing a fluorinated hollow structural body according to claim 1, wherein the removal step is conducted by dissolving and removing the center portion by bringing a solvent, in which the polymer shows solubility, into contact with the exposed center portion, and wherein the solvent has a temperature within a range from 0 to 250° C.

3. The method for producing a fluorinated hollow structural body according to claim 1, wherein the removal step is conducted by heating at a temperature within a range from 50 to 400° C. under an inactive gas atmosphere.

4. The method for producing a fluorinated hollow structural body according to claim 1, wherein a pre-treatment step of heating the non-hollow structural body under an inactive gas atmosphere and under a predetermined processing condition is conducted before said fluorination treatment.

5. The method for producing a fluorinated hollow structural body according to claim 1, wherein immediately after said fluorination treatment, a post-treatment step of heating the non-hollow structural body under a predetermined processing condition is conducted.

6. The method for producing a fluorinated hollow structural body according to claim 1, wherein as the treating gas, at least any one gas is selected from the group consisting of hydrogen fluoride (HF), fluorine ($F_2$), chlorine trifluoride ($ClF_3$), sulfur tetrafluoride ($SF_4$), boron trifluoride ($BF_3$), nitrogen trifluoride ($NF_3$), carbonyl fluoride ($COF_2$), and a mixture of an inactive diluting gas with at least one of the above-cited fluorine-containing gases.

7. The method for producing a fluorinated hollow structural body according to claim 1, wherein the hydrocarbon polymer is an olefin polymer, a cyclic olefin polymer, an aromatic unsaturated hydrocarbon polymer, a polar group-containing polymer, or a copolymer containing two or more of the above-cited polymers.

* * * * *